(12) United States Patent
Madonia et al.

(10) Patent No.: US 9,550,139 B2
(45) Date of Patent: Jan. 24, 2017

(54) APPARATUS AND SYSTEM FOR CLEANING A FILTER

(71) Applicants: Vincent James Madonia, Cedar Grove, NJ (US); Gerald Madonia, Kenilworth, NJ (US)

(72) Inventors: Vincent James Madonia, Cedar Grove, NJ (US); Gerald Madonia, Kenilworth, NJ (US)

( * ) Notice: Subject to any disclaimer, the term of this patent is extended or adjusted under 35 U.S.C. 154(b) by 159 days.

(21) Appl. No.: 14/600,254

(22) Filed: Jan. 20, 2015

(65) Prior Publication Data

US 2015/0251117 A1    Sep. 10, 2015

Related U.S. Application Data

(60) Provisional application No. 61/966,779, filed on Mar. 4, 2014, provisional application No. 62/000,077, filed on May 19, 2014.

(51) Int. Cl.

| | |
|---|---|
| *B08B 3/00* | (2006.01) |
| *B01D 41/04* | (2006.01) |
| *A47L 9/20* | (2006.01) |
| *B08B 1/00* | (2006.01) |
| *A47J 31/08* | (2006.01) |
| *B01D 35/02* | (2006.01) |
| *B01D 35/16* | (2006.01) |
| *B01D 35/22* | (2006.01) |

(Continued)

(52) U.S. Cl.
CPC ............... *B01D 41/04* (2013.01); *A47J 31/08* (2013.01); *A47L 9/20* (2013.01); *B01D 25/00* (2013.01); *B01D 29/11* (2013.01); *B01D 35/02* (2013.01); *B01D 35/16* (2013.01); *B01D 35/22* (2013.01); *B01D 46/00* (2013.01); *B01D 46/02* (2013.01); *B08B 1/00* (2013.01); *D01H 11/00* (2013.01); *D06F 39/10* (2013.01); *F02M 35/02416* (2013.01); *F02M 35/02483* (2013.01); *F02M 35/08* (2013.01); *F04B 39/16* (2013.01); *F04B 53/20* (2013.01); *B08B 9/00* (2013.01)

(58) Field of Classification Search
CPC ............ B08B 11/00; B08B 1/002; B08B 1/04; B08B 1/00; B08B 9/00; F02M 35/02416; F02M 35/08; F02M 35/02483; A47J 31/08; B01D 35/02; B01D 35/16; B01D 35/22; B01D 46/00; B01D 46/02; B01D 25/00; B01D 29/11; D06F 39/10; D01H 11/00; F04B 39/16; F04B 53/20; A47L 9/20
USPC ......................................... 15/3, 21.1; 134/93
See application file for complete search history.

(56) References Cited

U.S. PATENT DOCUMENTS

| | | |
|---|---|---|
| 1,171,892 A | 2/1916 | Salisbury |
| 3,998,656 A | 12/1976 | Grotto |

(Continued)

*Primary Examiner* — Eric Golightly
(74) *Attorney, Agent, or Firm* — Gearhart Law LLC

(57) ABSTRACT

A filter cleaning apparatus has a top section and a base section. The top section rests on a housing support. A lid in the top section is connected to the top section by a hinge. Internally, there is a threaded rod supporting a cone and a positioning nut. The positioning nut is used to secure the position of the cone. When a filter is to be placed in the apparatus, the position of the cone is adjusted with the positioning nut. A filter is then placed thereon and the lid closed. A locking mechanism secured the lid in place. A textured disk is positioned on the underside of the lid. When a crank handle on top of the lid is turned, the textured disk is turned thereby turning the filter resting on the cone. As the filter turns, cleaning mechanisms remove debris which pass through openings for removal.

21 Claims, 8 Drawing Sheets

(51) Int. Cl.

| | |
|---|---|
| *B01D 46/00* | (2006.01) |
| *B01D 46/02* | (2006.01) |
| *B01D 25/00* | (2006.01) |
| *B01D 29/11* | (2006.01) |
| *D06F 39/10* | (2006.01) |
| *D01H 11/00* | (2006.01) |
| *F04B 39/16* | (2006.01) |
| *F04B 53/20* | (2006.01) |
| *F02M 35/08* | (2006.01) |
| *F02M 35/024* | (2006.01) |
| *B08B 9/00* | (2006.01) |

(56) References Cited

U.S. PATENT DOCUMENTS

| | | |
|---|---|---|
| 4,222,755 A | 9/1980 | Grotto |
| 4,512,088 A | 4/1985 | Clapper |
| 4,808,234 A | 2/1989 | McKay et al. |
| 5,143,529 A | 9/1992 | Means, Jr. |
| 5,330,065 A | 7/1994 | Bradley |
| 5,989,419 A | 11/1999 | Dudley et al. |
| 6,569,218 B2 | 5/2003 | Dudley |
| 6,598,263 B2 | 7/2003 | Boles et al. |
| 7,351,269 B2 | 4/2008 | Yau |
| 8,032,984 B2 | 10/2011 | Rowntree et al. |
| 8,549,704 B2 | 10/2013 | Milligan et al. |
| 8,568,536 B2 | 10/2013 | Meister et al. |
| 2005/0077227 A1 | 4/2005 | Kirker et al. |
| 2007/0240577 A1 | 10/2007 | Weiss |
| 2007/0266859 A1 | 11/2007 | Valenzi |
| 2010/0258147 A1 | 10/2010 | Iosbe et al. |

APPARATUS AND SYSTEM FOR CLEANING A FILTER

CLAIM OF PRIORITY

This application claims the priority of U.S. Ser. No. 61/966,779 filed on Mar. 4, 2014 and U.S. Ser. No. 62/000,077 filed on May 19, 2014, the contents of which are fully incorporated herein by reference.

FIELD OF THE EMBODIMENTS

The field of the invention and its embodiments relates to apparatuses directed towards cleaning filters, namely filters located in vacuum cleaners. In particular, the field of the invention relates to systematically cleaning dirty and/or clogged filters for reuse in vacuums and other devices employing replaceable filters.

BACKGROUND OF THE EMBODIMENTS

Typically, portable vacuum cleaners employ a motor that is powered by a battery or a main supply such as alternating or direct current. The motor has an impeller that upon activation creates an airflow which entrains dirt, dust, grime, etc. and transports it to a holding area or bag inside the vacuum cleaner. Filters are typically used to prevent the collected dirt and dust from leaving the confines of the vacuum cleaner and polluting the surrounding air and structures.

A known issue with vacuum cleaners, and filters in general, is that such filters readily become burdened with debris after a short time, thereby reducing the efficiency of the associated device. Once the filter has reached this level of saturation, a user must disassemble the vacuum or other device and remove the filter. The filter is then cleaned by hand or thrown away and a new filter is installed. This repeated removing and/or purchasing of the filter is time consuming and laborious, which can be an overriding factor in an individual simply continuing to use the appliance long after the filter should have been changed. This results in decreased appliance efficiency, giving way for longer use times to clean, for example, a soiled floor. This increased usage directly results in increased wear and tear on the parts of the appliance thereby decreasing the lifespan of the parts or the appliance as a whole.

Thus, there is a needs for a simple and effective mechanism to which by a filter can be cleaned and replaced while exposing the user to a minimal amount of airborne debris as a result of the cleaning. The present invention and various embodiments thereof meet and exceed these objectives.
Review of Related Technology:

U.S. Pat. No. 8,568,536 pertains to a tool for removing particulate matter from a diesel particulate filter (DPF) includes a container defining a chamber that has an open end, and a support associated with the open end that supports a first axial end of the DPF and forms a seal around an outside surface of the can of the DPF and the container. An air nozzle mounted proximate to a second axial end of the DPF directs a narrow flow of air through the DPF that passes through a portion of the DPF element bundle and exits through the first axial end into the container.

U.S. Pat. No. 7,351,269 pertains to a brush configured to move repeatedly over a vacuum filter. The brush will remove dust particles to prevent them from clogging the filter. In the preferred embodiment, the brush is mounted on a revolving shaft. As the shaft turns it moves the bristles of the brush over the surface of the filter, whereby dust particles may be dislodged. In one embodiment, the shaft is attached to the vacuum motor and is turned directly by the motor. In this embodiment a speed reducer may be employed to slow the rate of rotation of the brush. In another embodiment, a turbine is attached to the shaft. The turbine is placed in the path of the air stream moving through the vacuum. The air passing through the turbine cause it and the shaft to rotate, thereby reducing the load on the motor.

U.S. Pat. No. 6,569,218 pertains to a method of using vacuum cleaner filters that includes mounting a cylindrical-shaped filter cartridge coaxially on a rotatable spindle. Then air is drawn radially through a filter material wall of the filter cartridge. Periodically, the cartridge filter on the spindle is spun to dislodge any debris entrapped in the filter material by centrifugal force. Air flow is selectively drawn or pushed radially through a filter material wall of the filter cartridge. A clutch disposed between a motor and the spindle is used to periodically spin the cartridge filter on the spindle to dislodge any debris entrapped in the filter material by centrifugal force. Preferably, a motor that can be run in either a forward direction or a reverse direction is used.

U.S. Pat. No. 5,330,065 pertains to a rotatable holding rack to facilitate the process of cleaning reusable washable cartridge filters, such as those filters commonly used with swimming pool filtration systems. A vertically positioned cartridge filter is securely mounted onto a rotatable wash rack and is held in a stationary mode as the frontally exposed area is washed clean by a hand-held jet-nozzled water hose. The filter unit is then revolved to the next selected frontal exposure, by rotating a finned circular flat platform to which the filter unit is attached, by redirecting the water-force of the hand-held hose to rotatable platform fins.

U.S. Pat. No. 5,143,529 pertains to a filter cleaning apparatus for cleaning cylindrical filters comprising a support frame, a mounting clamp on the support frame for supporting a filter in a vertical orientation, inner and outer air nozzles mounted for vertical movement along the inner and outer surfaces of a filter for directing an air jet against the respective surface for dislodging debris therefrom, and inner and outer vacuum nozzles mounted adjacent to and moveable with the air nozzles for drawing in debris dislodged by the air jets.

Various devices are known in the art. However, their structure and means of operation are substantially different from the present disclosure. Such devices require external power sources to drive motors and expel debris. The other inventions also fail to solve all the problems taught by the present disclosure. The present invention and its embodiments provide for a filter cleaner that is readily portable and requires no external electricity to operate. At least one embodiment of this invention is presented in the drawings below and will be described in more detail herein.

SUMMARY OF THE EMBODIMENTS

The present invention describes and teaches a filter cleaning apparatus having a housing with a top section and a base section, wherein the top section has a lid hingeably coupled thereto and the top section is attached to the base section, wherein the base section has a plurality of openings; a disk rotatably coupled to the lid of the top section; a threaded rod rotatably coupled to the base section, wherein the threaded rod has an adjustment mechanism attached thereto; at least one cleaning mechanism extending from an inner wall of the base section; and a crank handle rotatably coupled to the lid.

In another aspect of the invention there is a filter cleaning system having a filter cleaning apparatus comprising, a circular housing having a top section and a base section, wherein the top section has a lid hingeably coupled thereto and the top section is attached to the base section, wherein the base section has at least one sidewall and a bottom, wherein there are a plurality of openings in the sidewall or bottom or in a combination of the sidewall and bottom, a housing support having a supporting structure defining a cavity, wherein the top section is supported by the supporting structure and the base section is contained within the supporting structure, a textured disk rotatably coupled to a bottom of the lid of the top section, a threaded rod rotatably coupled to the base section, wherein the threaded rod has an adjustment mechanism attached thereto, a plurality of cleaning mechanisms extending from an inner wall of the base section, and a crank handle rotatably coupled to the lid, wherein the lid is secured to the top section with a locking mechanism; and at least one filter, wherein the filter is positioned over and rests on the adjustment mechanism.

Generally, the present invention is designed to be used with filters having a circular shape, although it is envisioned numerous types (i.e. shape, size, and material) of filters can be used with the present invention. The filter preferably has a central aperture which can accept the adjustment mechanism, namely the threaded rod, therethrough. The housing fits partially within a housing support. The housing support is used to support the housing and provide a container for debris cleaned from the filter. Before the housing is positioned in the housing support, the adjustment mechanism is adjusted to compensate for the size of the filter to be cleaned.

Once in position, the filter can be placed on the adjustment mechanism inside the housing the lid closed and secured with the locking mechanism. The housing can now be placed in the housing support and the crank handle turned. When the crank handle is turned, the filter is rotated on the adjustment mechanism. Along an inner surface of the housing, are a series of positioned cleaning mechanisms which clear debris from the filter allowing gravity to pull it toward the bottom of the housing. There are a number of openings in the base section of the housing that allows removed dirt and dust to settle in the housing support. Once the debris has settled, one can then remove the filter from the apparatus and place it back in the appliance for usage.

In general, the present invention succeeds in conferring the following, and others not mentioned, benefits and objectives.

It is an object of the present invention to provide a filter cleaning apparatus that is portable and easy to use.

It is an object of the present invention to provide a filter cleaning apparatus that requires no external power source.

It is an object of the present invention to provide a filter cleaning apparatus that cleans a filter without damaging it thereby enabling it to be replaced within the device it is used.

It is an object of the present invention to provide a filter cleaning apparatus that extends the life of expensive filters.

It is an object of the present invention to provide a filter cleaning apparatus that can be quickly cleaned after use and be ready to use again when necessary.

It is an object of the present invention to provide a filter cleaning apparatus that contains the debris removed from a filter.

It is an object of the present invention to provide a filter cleaning apparatus that can be used with filters of varying shapes, sizes, and materials.

It is another object of the present invention to provide a filter cleaning apparatus that is lightweight.

It is another object of the present invention to provide a filter cleaning apparatus that can be used with a number of support housings.

DESCRIPTION OF THE PREFERRED EMBODIMENTS

Figure 1A:
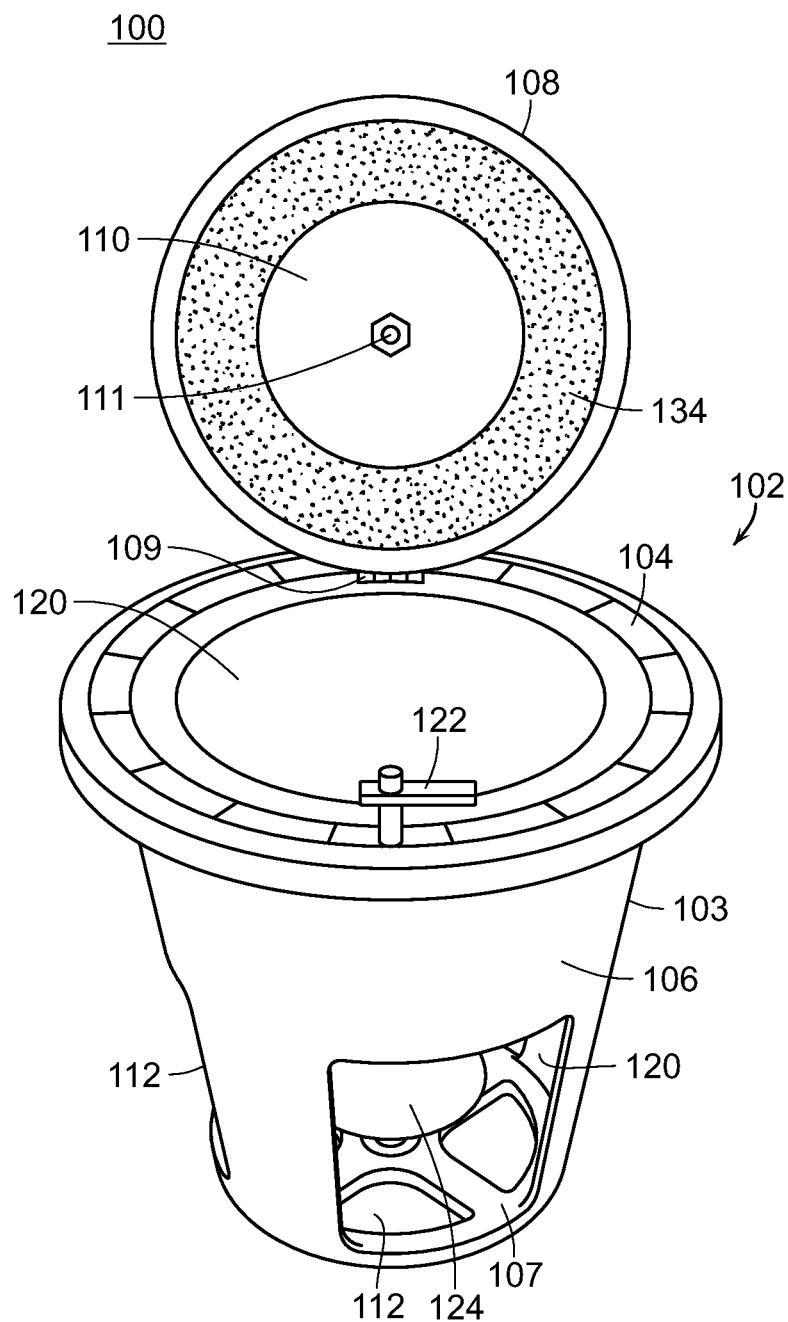
FIG. 1A is a perspective view of an embodiment of the present invention with the lid open.

The preferred embodiments of the present invention will now be described with reference to the drawings. Identical elements in the various figures are identified with the same reference numerals. Reference will now be made in detail to each embodiment of the present invention. Such embodiments are provided by way of explanation of the present invention, which is not intended to be limited thereto. In fact, those of ordinary skill in the art may appreciate upon reading the present specification and viewing the present drawings that various modifications and variations can be made thereto.

Figure 1B:
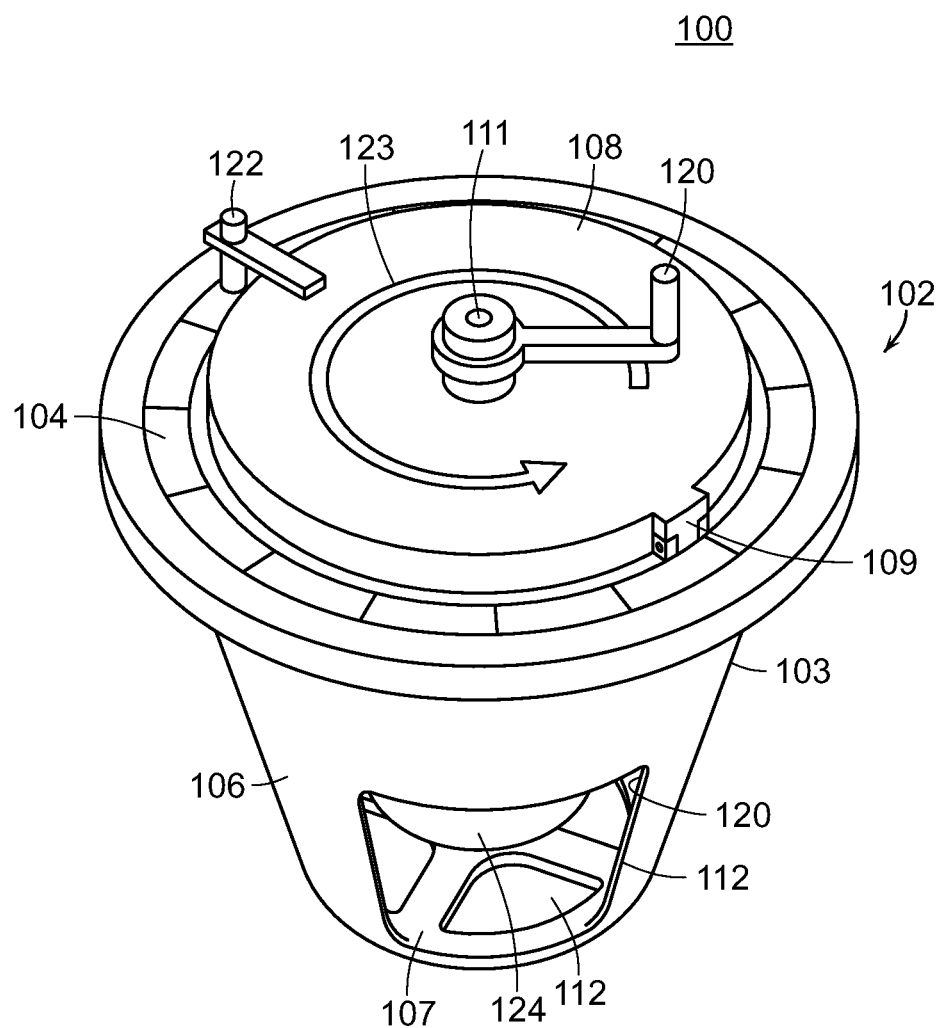
FIG. 1B is a perspective view of an embodiment of the present invention with the lid closed.

Referring now to FIGS. 1A and 1B, there is a perspective view of a filter cleaning apparatus 100 with a lid 108 opened (FIG. 1A) and a lid 108 closed (FIG. 1B). The filter cleaning apparatus 100 has a housing 102 with a top section 104 and a base section 106. The top section 104 generally provides access to the internal mechanisms of the filter cleaning apparatus 100 and the base section 106 provides protection for these components, as well as providing avenues for dirt and dust to be removed from a filter 136 (see FIG. 5).

The top section 104 has a lid 108 connected thereto with a hinge 109. The hinge 109 enables movement of the lid 108. The bottom of the lid 134 has a textured disk 110 coupled thereto. The textured disk 110 is rotatably coupled to the lid 108 via a nut and bolt 111 or other comparable coupling mechanism. The nut and bolt 111 passes through the lid 108 and attaches to the crank handle 120 as shown in FIG. 1B. The crank handle 120 is turned along the pathway shown by numeral 123. This, in turn, causes rotation of the textured disk 110. When the filter cleaning apparatus 100 is in use, a locking mechanism 122 is used to secure the lid 108 in place. The locking mechanism 122 is preferably a wing nut, latch, clip, clamp, or the like or a combination thereof that secures the lid 108 to the top section 104.

The basal part (base) 106 of the filter cleaning apparatus 100 has sidewalls 103 and a bottom 107. The sidewalls 103 are generally circular and have no distinct edges, although numerous shapes may be employed including those with distinct edges and individual sidewalls 103. The top of the base 106 has a greater diameter than that of the bottom of the base 106. Further, the base section 106 has a smaller, or lesser, diameter than that of the top section 104. The sidewalls 103 and bottom 107 may have either singularly or in combination a plurality of openings 112. These openings 112 provide an avenue for dirt and dust to leave the confines of the filter cleaning apparatus 100. Some inner structure, including the inner wall 120 and cone 124 can be seen in FIG. 1A but is better exemplified in the descriptions below.

Figure 2:
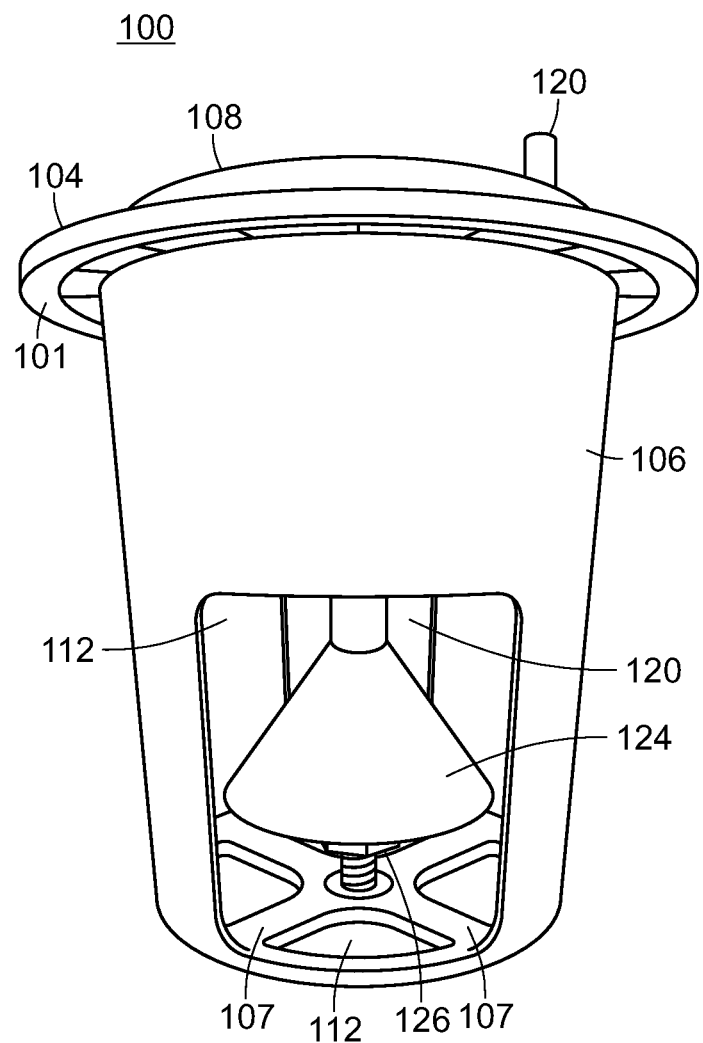
FIG. 2 is a side view of an embodiment of the present invention.

In FIG. 2 there is a side view of the filter cleaning apparatus 100. The view is less focused on the crank handle 120, lid 108, hinge 109 (not shown) and top section 104 and better demonstrates the features of the base section 106.

The base section 106 is attached to the bottom of the top section 101. The base section 106 is preferably permanently coupled thereto, although it may be removable in some instances. The openings 112 are shown in triplets in the sidewalls 103 and the bottom 107. The spatial arrangement of the openings 112 may vary and the number of openings may vary as well. The cone 124 sits roughly in the middle of the bottom 107 and is height adjustable using the positioning nut 126.

Figure 3A:
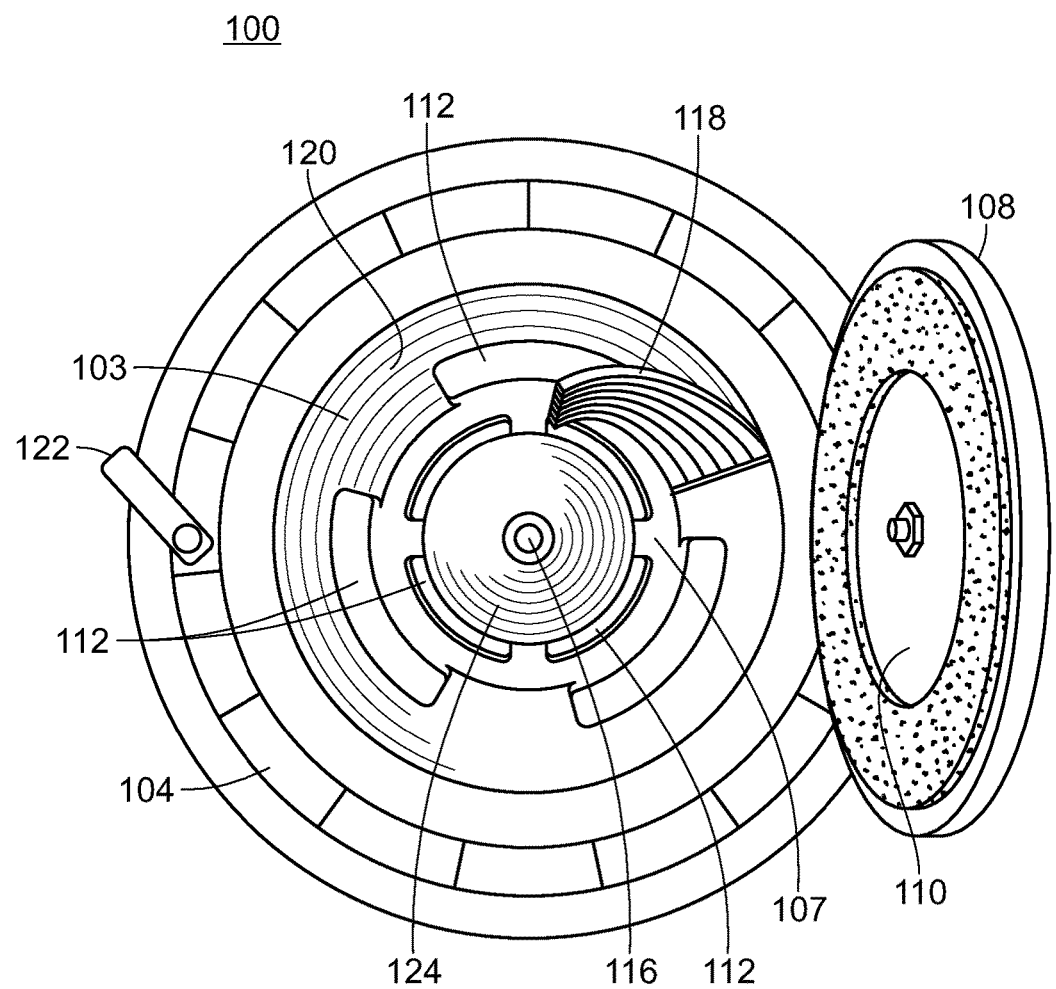
FIG. 3A is a top view of an embodiment of the present invention with the lid open.

FIG. 3A shows a top view of the filter cleaning apparatus 100 with the lid 108 in an open position. Looking through the top section 104 and into the base section 106, the adjustment mechanism 116 is visible. One component of the adjustment mechanism 116, the cone 124, is also visible. There are numerous openings 112 in the sidewalls 103 and the bottom 107. A cleaning mechanism 118 is shown disposed along the inner wall 120 of the filter cleaning apparatus 100. The cleaning mechanism 118 is preferably a brush or an extension with bristled endings extending therefrom. The position and number of cleaning mechanisms 118 is determined by the size of the filter and the type of material comprising the filter. The cleaning mechanisms 118 may be interchangeable and/or removable to suit a particular individual's needs.

Figure 3B:
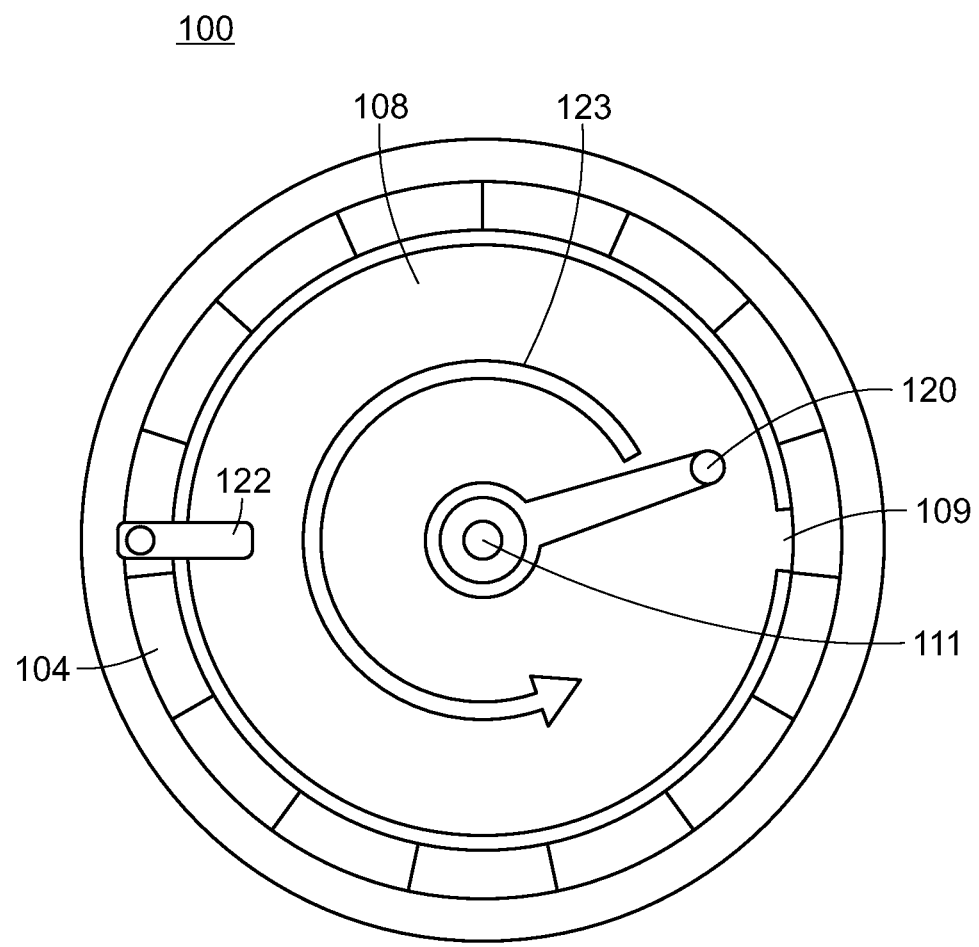
FIG. 3B is a top view of an embodiment of the present invention with the lid closed.

Referring now to FIG. 3B, the lid 108 has been closed and the locking mechanism 122 positioned to secure the lid 108 in place. The hinge 109 allows for the opening and closing of the lid 108, as well as keeping the lid 108 secure opposite the locking mechanism 122. The crank handle 120 is rotatably coupled to the lid 108 and textured disk 110 (see FIG. 3A) with a nut and bolt 111. The pathway 123 signifies the direction of travel for the crank handle 120 in order to clean the filter 136 (see FIG. 5). The number of revolutions of the crank handle 120 may vary but is envisioned to be between about 1 and about 15 in order to properly clean the filter.

Figure 4:
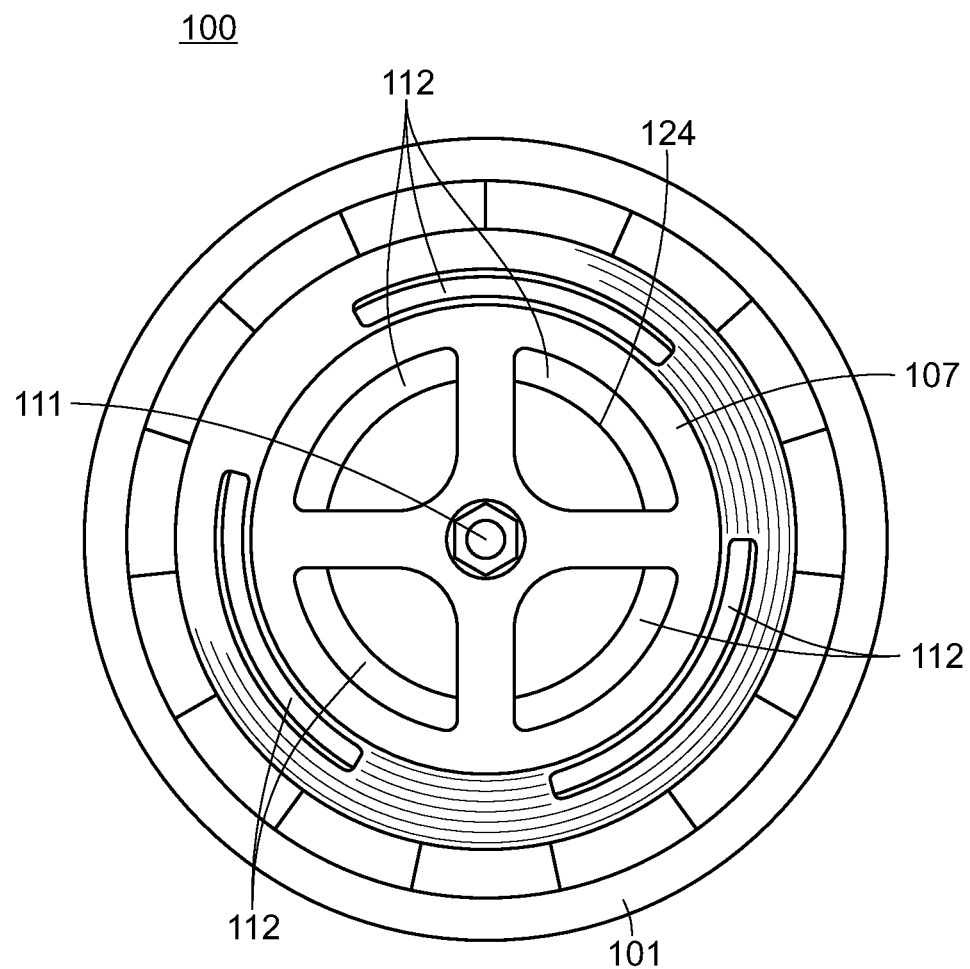
FIG. 4 is a bottom view of an embodiment of the present invention.

In FIG. 4, the filter cleaning apparatus 100 is shown from a bottom view. Here, the structure of the bottom 107 of the base 106 is apparent. The cone 124 is preferably centrally positioned about the threaded rod 114 (see FIG. 5) which is secured using a nut and bolt 111. The openings 112 are positioned below the threaded rod 114 and cone 124. The openings 112 are positioned in a way to provide as much open area below the cone 124 while still providing some structural support and protection from internal damage. The top section 104 (see FIG. 1A) is preferably larger in diameter than the base section 106, thus the bottom side of the lid 101 is visible from this viewpoint.

Figure 5:
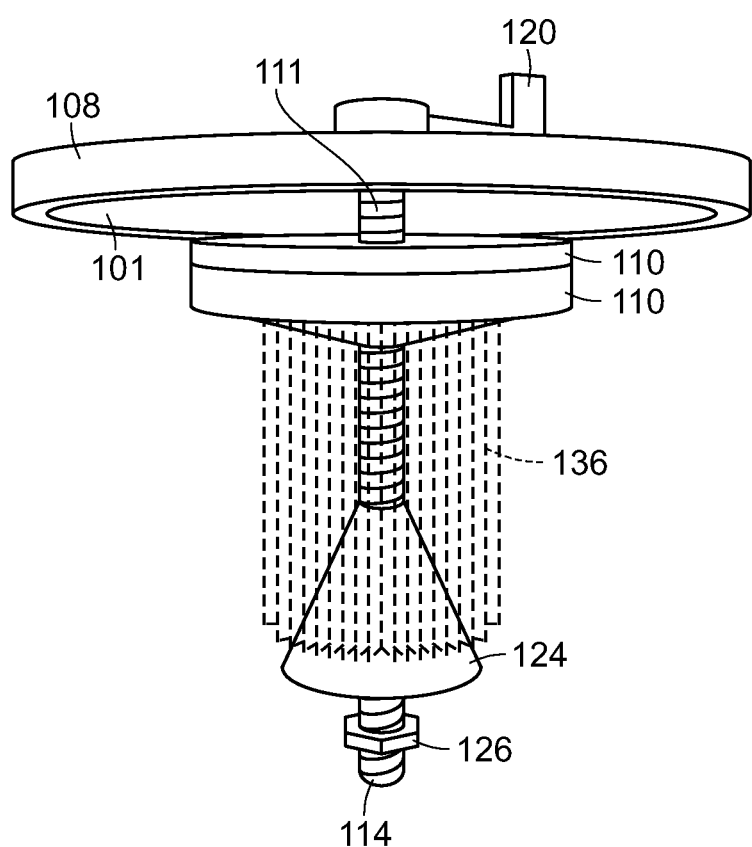
FIG. 5 is a side view of the lid and threaded bolt with a filter resting on the adjustment mechanism.

FIG. 5 shows the filter cleaning apparatus 100 with the base section 106 removed, thereby exposing the internal components. The lid 108 is shown in a closed position as if ready for use. The crank handle 120 is shown connected to the textured disk 110 via a nut and bolt 111.

The adjustment mechanism 116, as described and shown in FIG. 3A, is shown from the side highlighting its components: the threaded rod 114, the positioning nut 126, and cone 124. In order to accommodate a filter 136 the positioning nut 126 is moved up or down along the threaded rod 114. The cone 124 rests on the positioning nut 126 thereby positioning the cone 124 along the threaded rod 114. The filter 136 can then be positioned on the cone 124 and the lid 108 closed. This places the filter 136 between the cone 124 and the textured disk 110. The texturing of the textured disk 110 provides grip at the connection between it and the filter 136. When the crank handle 120 is rotated in a circular motion the textured disk 110 follows the same motion. The motion of the textured disk 110 grips the filter 136 and rotates it about a vertical axis. The cleaning mechanisms 118 (see FIG. 3A) contact the filter 136 thereby removing dirt and dust from the filter surface. The dirt and dust falls off the filter 136 and passes through the openings 112 (see FIG. 1A) for removal.

Figure 6:
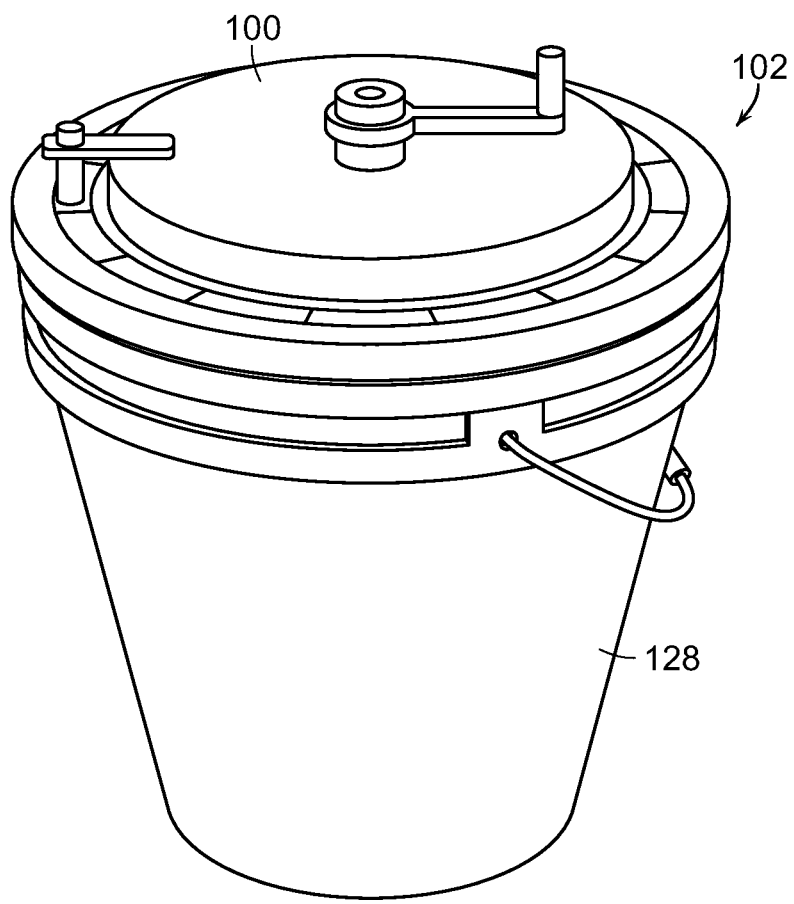
FIG. 6 is a perspective view of an embodiment of the present invention with a housing support.

In FIG. 6, the filter cleaning apparatus 100 is shown being used in conjunction with a housing support 128. The housing support 128 supports the housing 102 and provides a container to retain the dirt and dust removed from the filter. The housing support 128 can take a number of forms and is generally a container large enough to receive the housing 102 and small enough to enable the bottom 101 of the top section 104 to rest upon an upper surface of the housing support 128. In a preferred embodiment, the housing 102 can be used in conjunction with container or bucket sized to accommodate the housing. This further lends itself to the portability and flexibility in use of the filter cleaning apparatus 100.

After the dust and dirt have been removed from the filter, the entire apparatus is left to sit for a short duration of time. This allows the fine particulates comprising the dirt and dust to settle to the bottom of the housing support 128. After which, the housing 102 can be removed and the housing support 128 readily transported to a disposal area to be emptied of its contents.

The filter cleaning apparatus generally described in FIGS. 1-6 can be used on most any type of filter including those in pumps and vacuums. Preferably, the filter cleaning apparatus 100 is constructed of plastics may include but are not limited to polyethylene terephthalate (PET), polyethylene (PE), high-density polyethylene, polyvinyl chloride (PVC), polyvinylidene chloride (PVDC), low-density polyethylene (LDPE), polypropylene (PP), polystyrene (PS), high impact polystyrene (HIPS) and polycarbonate (PC), or any combination thereof. The filter cleaning apparatus 100 and its various components may further comprise a number of other materials including metals, rubbers, composites, and the like. Composites may include but are not limited to fiber reinforced plastics, metal composites, carbon fiber, and Kevlar® containing compounds and the like. Metals may comprise lightweight metals such as aluminum and other pure metals as well as various alloys. Rubbers may include but are not limited to natural rubber, SBR, Isoprene rubber, Butadiene rubber, and (poly)chloroprene rubber.

The filter cleaning apparatus 100 can be used on its own or with a housing support 128. The housing support 128 as described above is typically an intended to be a standard bucket or container that holds 5 US gallons. However, the housing support 128 can vary in size, depending on the size of the filter cleaning apparatus 100. In the preferred embodiment, the size and compatibility with a 5 gallon container, which is prevalent in many environments, lends itself to an increased amount of portability. It also makes the apparatus as a whole lightweight and easy to use and dispose of waste. Many filter cleaners can be large and cumbersome and are often on wheeled dollies to attempt to facilitate their movement. However, their range is limited since they are also electronically operated. This means the filter must be brought to the cleaner rather than the cleaner being brought where one needs it.

Thus, it is preferred that the base section 106 of the filter cleaning apparatus 100 is about 13 cm (5 inch) to about 152 cm (60 inch) in height and slightly tapered from the top of the base section 106 to the bottom of the base section 106. More preferably, the base section 106 is about 25 cm (10 inch) to about 50 cm (20 inch) in height and most preferably about 38 cm (15 inch) in height. The top section 104 must also have a sufficient diameter to rest on the housing support 128. Thus, it is preferred that the top section 104 has a diameter of about 13 cm (5 inch) to about 152 cm (60 inch) and more preferably about 20 cm (8 inch) to about 38 cm (15 inch). Most preferably, the diameter of the top section 104 is at least about 30 cm (12 inch).

The cleaning mechanisms 118 primarily described in FIG. 3A can be a variety of mechanisms and combinations of varying mechanisms in order to properly clean the filter 136. Preferably, the cleaning mechanisms 118 comprise natural or synthetic polymers that are selected as to not damage or abrade the filter 136. However, any compounds exhibiting these properties may be used for the cleaning mechanisms 118. There also may be multiple layers or lengths to the cleaning mechanisms 118.

Typically the filters to be cleaned have a ridged or folded pattern creating a series of pointed peaks and valleys. Thus, it is necessary to have a cleaning mechanism 118 that can reach all the crevices of the filter 136. Further, the cleaning mechanisms 118 may be oriented in a particular fashion to effectively clean the filter 136. The pathway 123 is shown to be in a counter-clockwise motion. However, in some embodiments, the direction the crank handle 120 is turned will have no detrimental effects and by following a back and forth pathway may increase the amount of dirt, dust, and debris removed from the filter 136. The cleaning mechanisms 118, in some embodiments, may be able to be moved along a vertical axis while the filter 136 is rotated to promote cleaning. The filter(s) 136 compatible with the apparatus may be filters suitable for use in both wet and dry filtering methodologies.

The openings 112 allow the aforementioned dirt, dust, and debris to be removed from the filter 136 and exit through the base section 106. The configuration and size of the openings may vary. Preferably there are a plurality of openings 112 that are sized to allow material removed from the filter to pass through the base section 106 and into the housing support 128 or surrounding environment. The openings 112 may be present in the sidewalls 103 or bottom 107 or both. The spatial arrangement of the openings 112 may have an influence as to the efficacy of removal.

Although this invention has been described with a certain degree of particularity, it is to be understood that the present disclosure has been made only by way of illustration and that numerous changes in the details of construction and arrangement of parts may be resorted to without departing from the spirit and the scope of the invention.

What is claimed is:
1. A filter cleaning apparatus comprising:
   a housing having a top section and a base section,
      wherein the top section has a lid hingeably coupled thereto and the top section is attached to the base section,
      wherein the base section has a plurality of openings;
   a disk rotatably coupled to the lid of the top section;
   a threaded rod rotatably coupled to the base section,
      wherein the threaded rod has an adjustment mechanism attached thereto;
   at least one cleaning mechanism extending from an inner wall of the base section;
   and
   a crank handle rotatably coupled to the lid.
2. The apparatus of claim 1 further comprising a locking mechanism.
3. The apparatus of claim 2 wherein the locking mechanism secures the lid to the top section thereby keeping it shut during use.
4. The apparatus of claim 1 wherein the housing is generally circular in shape.
5. The apparatus of claim 1 the adjustment mechanism further comprising a cone threadably engaged to the threaded rod,
   wherein the height of the cone is determined by a positioning nut.
6. The apparatus of claim 1 wherein the cleaning mechanism is a brush.
7. The apparatus of claim 6 wherein the type of brush is selectable based on the composition of the item being cleaned.
8. The apparatus of claim 6 wherein there is a plurality of brushes disposed on the inner surface of the base section.
9. The apparatus of claim 1 further comprising a housing support,
   wherein the housing support receives and envelops the base section of the housing.
10. A filter cleaning apparatus comprising:
    a circular housing having a top section and a base section,
       wherein the top section has a lid hingeably coupled thereto and the top section is attached to the base section,
       wherein the base section has at least one sidewall and a bottom,
          wherein there are a plurality of openings in the sidewall or bottom or in a combination of the sidewall and bottom;
    a textured disk rotatably coupled to a bottom of the lid of the top section;
    a threaded rod rotatably coupled to the base section,
       wherein the threaded rod has an adjustment mechanism attached thereto;
    a plurality of cleaning mechanisms extending from an inner wall of the base section; and
    a crank handle rotatably coupled to the lid;
    wherein the lid is secured to the top section with a locking mechanism.
11. The apparatus of claim 10 wherein the adjustment mechanism is adjustable along a vertical axis of the threaded rod.
12. The apparatus of claim 10 wherein rotating the crank handle results in rotation of the textured disk.
13. A filter cleaning system comprising:
    a filter cleaning apparatus comprising,
       a circular housing having a top section and a base section,
          wherein the top section has a lid hingeably coupled thereto and the top section is attached to the base section,
          wherein the base section has at least one sidewall and a bottom,
             wherein there are a plurality of openings in the sidewall or bottom or in a combination of the sidewall and bottom, a textured disk rotatably coupled to a bottom of the lid of the top section, a threaded rod rotatably coupled to the base section,
 wherein the threaded rod has an adjustment mechanism attached thereto, a plurality of cleaning mechanisms extending from an inner wall of the base section, and a crank handle rotatably coupled to the lid,
 wherein the lid is secured to the top section with a locking mechanism;
and a housing support capable of receiving the filter cleaning apparatus,
 wherein the top section is supported by the supporting structure and the base section is contained within the supporting structure.

14. The system of claim 13 further comprising at least one filter,
 wherein the filter is positioned over and rests on the adjustment mechanism.

15. The system of claim 14 wherein the adjustment mechanism is positionable based on the size of the filter.

16. The system of claim 14 wherein the filter is positionable between the adjustment mechanism and the textured disk.

17. The system of claim 16 wherein at least one of the plurality of cleaning mechanisms contacts the filter.

18. The system of claim 17 wherein debris removed from the filter by the cleaning mechanisms passes through the openings in the bottom and sidewall of the base section.

19. The system of claim 13 wherein the filter is can be used for dry and wet applications.

20. The system of claim 19 wherein the filter is for a vacuum.

21. A method of cleaning a filter comprising the steps of:
 a) providing a filter cleaning apparatus comprising,
  a housing having a top section and a base section,
   wherein the top section has a lid hingeably coupled thereto and the top section is attached to the base section,
   wherein the base section has a plurality of openings,
  a disk rotatably coupled to the lid of the top section,
  a threaded rod rotatably coupled to the base section,
   wherein the threaded rod has an adjustment mechanism attached thereto,
  at least one cleaning mechanism extending from an inner wall of the base section,
  and
  a crank handle rotatably coupled to the lid;
 b) manipulating the adjustment mechanism based on a filter to be cleaned;
 c) placing the filter in the filter cleaning apparatus; and
 d) rotating the crank handle at least one complete revolution.

* * * * *